United States Patent
Grestenberger et al.

(10) Patent No.: US 10,696,834 B2
(45) Date of Patent: Jun. 30, 2020

(54) POLYOLEFIN COMPOSITION WITH IMPROVED THOUGHNESS

(71) Applicant: BOREALIS AG, Vienna (AT)

(72) Inventors: Georg Grestenberger, St. Peter in der Au (AT); Daniela Mileva, Pichling (AT); Susanne Kahlen, Leonding (AT); Michael Jerabek, Leonding (AT)

(73) Assignee: BOREALIS AG, Vienna (AT)

( * ) Notice: Subject to any disclaimer, the term of this patent is extended or adjusted under 35 U.S.C. 154(b) by 60 days.

(21) Appl. No.: 16/069,392

(22) PCT Filed: Jan. 27, 2017

(86) PCT No.: PCT/EP2017/051706
§ 371 (c)(1),
(2) Date: Jul. 11, 2018

(87) PCT Pub. No.: WO2017/129712
PCT Pub. Date: Aug. 3, 2017

(65) Prior Publication Data
US 2019/0031870 A1 Jan. 31, 2019

(30) Foreign Application Priority Data
Jan. 29, 2016 (EP) .................................... 16153371

(51) Int. Cl.
*C08L 23/12* (2006.01)
*C08L 23/16* (2006.01)
*C08L 23/14* (2006.01)

(52) U.S. Cl.
CPC ............... *C08L 23/16* (2013.01); *C08L 23/12* (2013.01); *C08L 23/14* (2013.01); *C08L 2205/02* (2013.01); *C08L 2205/025* (2013.01); *C08L 2205/03* (2013.01); *C08L 2205/12* (2013.01); *C08L 2205/22* (2013.01); *C08L 2205/24* (2013.01); *C08L 2207/02* (2013.01); *C08L 2314/02* (2013.01)

(58) Field of Classification Search
CPC .......... C08L 23/12; C08L 23/14; C08L 23/16; C08L 51/06; C08L 2205/02; C08L 2314/02; C08L 2205/22; C08L 2207/02; C08L 2205/24; C08L 2205/03
See application file for complete search history.

(56) References Cited

U.S. PATENT DOCUMENTS

| | | | |
|---|---|---|---|
| 4,753,997 A | 6/1988 | Shyu et al. | |
| 2014/0357771 A1* | 12/2014 | Tranninger et al. | C08L 23/14 524/210 |
| 2015/0259453 A1 | 9/2015 | Peterson et al. | |
| 2019/0031869 A1* | 1/2019 | Grestenberger et al. | C08L 23/12 |

FOREIGN PATENT DOCUMENTS

| | | |
|---|---|---|
| EP | 0491566 A2 | 9/1992 |
| EP | 0586390 B1 | 3/1994 |
| EP | 0591224 B1 | 4/1994 |
| EP | 0887379 A1 | 12/1998 |
| EP | 1805238 B1 | 7/2007 |
| EP | 1847565 A1 | 10/2007 |
| EP | 2308923 A1 | 4/2011 |
| EP | 2551299 A1 | 1/2013 |
| EP | 2573134 A1 | 3/2013 |
| EP | 2821434 A1 | 1/2015 |
| EP | 3095818 A1 | 11/2016 |
| RU | 2506288 C2 | 2/2014 |
| WO | 1987/07620 A1 | 12/1987 |
| WO | 1992/012182 A1 | 7/1992 |
| WO | 1992/19653 A1 | 11/1992 |
| WO | 1992/19658 A1 | 11/1992 |
| WO | 1999/24479 A1 | 10/1994 |
| WO | 1999/024478 A1 | 5/1999 |
| WO | 2000/068315 A1 | 11/2000 |
| WO | 2004/000889 A1 | 12/2003 |
| WO | 2013/149915 A1 | 10/2013 |
| WO | 2016/005301 A1 | 1/2016 |

OTHER PUBLICATIONS

European Office action for Application No. 16153371.6-1102, dated Nov. 29, 2018.
Zhou et al., "A new decoupling method for accurate quantification of polyethylene copolymer composition and triad sequence distribution with 13C NMR", Journal of Magnetic Resonance 187 (2007) pp. 225-233.
Wang et al., "Structural Analysis of Ethylene/Propylene Copolymers Synthesized with a Constrained Geometry Catalyst", Macromolecules 2000, 33, pp. 1157-1162.
Singh et al., "Triad sequence determination of ethylene—propylene copolymers—application of quantitative 13C NMR", Polymer Testing 28 (2009) pp. 475-479.
Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.
Kakugo et al., "13C NMR Determination of Monomer Sequence Distribution in Ethylene-Propylene Copolymers Prepared with d-TiC13-Al(C2H5)2C1" Macromolecules 1982, 15, pp. 1150-1152.
Resconi et al., "Selectivity in Propene Polymerization with Metallocene Catalysts", Chem. Rev. 2000, 100, pp. 1253-1345.
H.N.Cheng, "13C NMR Analysis of Ethylene-Propylene Rubbers", Macromolecules 1984, 17, 1950-1955.
Zweifel, et al., "Plastics Additives Handbook", 5th Edition, Department of Materials, Institute of Polymers, 2001.
Russian Office action for Application No. 2018129300/04, dated Apr. 18, 2019.

* cited by examiner

Primary Examiner — Nathan M Nutter
(74) Attorney, Agent, or Firm — Tarolli, Sundheim, Covell & Tummino LLP

(57) ABSTRACT

A polyolefin composition comprising a heterophasic propylene copolymer and a polar modified α-polyolefin.

23 Claims, No Drawings

POLYOLEFIN COMPOSITION WITH IMPROVED THOUGHNESS

The present invention is directed to a new polyolefin composition comprising a heterophasic propylene copolymer and a polar modified α-polyolefin as well as to automotive articles comprising said polyolefin composition.

In the automotive industry there is recent demand towards weight reduction and improvement in dimensional stability of the final parts. Accordingly various automotive applications such as bumper or door claddings are made out of advanced polypropylene materials. These polypropylene materials are usually heterophasic polypropylene propylene copolymers, where a (semi)crystalline polypropylene forms the continuous phase in which an elastomeric propylene copolymer is dispersed.

Shrinkage of bigger automobile parts is very detrimental. Accordingly there is a strong demand in the automobile industry to find polymer components with low shrinkage characteristic. Further also a very low coefficient of thermal expansion is of high interest when plastics are combined with metals. Beside the good dimensional stability, excellent ductile behavior and good stiffness are further requirements for an advanced heterophasic propylene copolymer materials. Fulfillment of the complete thermo-mechanical and dimensional-stability material profile has always remained a challenge due to the antagonistic effects of the particular properties. In the presence case it is sought for a polyolefin composition having excellent impact behavior, good stiffness as well as good dimensional stability.

Accordingly the present invention is directed in a $1^{st}$ embodiment to a polyolefin composition (PO) comprising an heterophasic propylene copolymer (HECO) and a polar modified α-polyolefin (PMP), wherein said heterophasic propylene copolymer (HECO) comprises
(a) a (semi)crystalline polypropylene (PP); and
(b) an elastomeric propylene copolymer (EPC) dispersed in said (semi)crystalline polypropylene (PP)
wherein said polyolefin composition (PO) has
(i) a xylene cold soluble (XCS) fraction in the range of 28 to 45 wt.-%;
wherein further the xylene cold soluble (XCS) fraction of said polyolefin composition (PO) has
(ii) an intrinsic viscosity (IV) in the range of 1.80 to 3.30 dl/g.

Preferably the polyolefin composition (PO) of the $1^{st}$ embodiment is further defined by
(a) the intrinsic viscosity (IV) of the xylene cold insoluble (XCI) fraction of the heterophasic propylene copolymer (HECO) being in the range of 1.00 to 1.30 dl/g;
and/or
(b) the melt flow rate $MFR_2$ (230° C.) measured according to ISO 1133 of the (semi)crystalline polypropylene (PP) of the heterophasic propylene copolymer (HECO) being in the range of 45 to 150 g/10 min,
and/or
(c) the intrinsic viscosity (IV) of the xylene cold soluble (XCS) fraction of the heterophasic propylene copolymer (HECO) being in the range of 1.50 to 3.00 dl/g.

In a $2^{nd}$ embodiment the polyolefin composition (PO) comprises an heterophasic propylene copolymer (HECO) and a polar modified α-polyolefin (PMP), wherein said heterophasic propylene copolymer (HECO) comprises
(a) a (semi)crystalline polypropylene (PP) having a melt flow rate $MFR_2$ (230° C.) measured according to ISO 1133 in the range of 45 to 150 g/10 min; and
(b) an elastomeric propylene copolymer (EPC) dispersed in said (semi)crystalline polypropylene (PP)
wherein said heterophasic propylene copolymer (HECO) has
(i) a xylene cold soluble (XCS) fraction in the range of 25 to 40 wt.-%;
wherein further the xylene cold soluble (XCS) fraction of said heterophasic propylene copolymer (HECO) has
(ii) a comonomer content in the range of 21 to 55 mol-%; and
(iii) optionally an intrinsic viscosity (IV) in the range of 1.50 to 3.00 dl/g,
and optionally still further
(iv) the intrinsic viscosity (IV) of the xylene cold insoluble (XCI) fraction of the heterophasic propylene copolymer (HECO) is in the range of 1.00 to 1.30 dl/g.

In a $3^{rd}$ embodiment the polyolefin composition (PO) comprises an heterophasic propylene copolymer (HECO) and a polar modified α-polyolefin (PMP), wherein said heterophasic propylene copolymer (HECO) comprises
(a) a (semi)crystalline polypropylene (PP) optionally having a melt flow rate $MFR_2$ (230° C.) measured according to ISO 1133 in the range of 45 to 150 g/10 min; and
(b) an elastomeric propylene copolymer (EPC) dispersed in said (semi)crystalline polypropylene (PP)
wherein said heterophasic propylene copolymer (HECO) has
(i) a xylene cold soluble (XCS) fraction in the range of 25 to 40 wt.-%;
wherein further the xylene cold soluble (XCS) fraction of said heterophasic propylene copolymer (HECO) has
(ii) a comonomer content in the range of 21 to 55 mol-%; and
(iii) optionally an intrinsic viscosity (IV) in the range of 1.50 to 3.00 dl/g.
and still further
(iv) the intrinsic viscosity (IV) of the xylene cold insoluble (XCI) fraction of the heterophasic propylene copolymer (HECO) is in the range of 1.00 to 1.30 dl/g.

Preferably the polyolefin composition (PO) of the $2^{nd}$ or $3^{rd}$ embodiment has a xylene cold soluble (XCS) fraction in the range of 28 to 45 wt.-%, wherein optionally said xylene cold soluble (XCS) fraction has an intrinsic viscosity (IV) in the range of 1.80 to 3.30 dl/g.

Alternatively to the previous paragraph the xylene cold soluble (XCS) fraction of the polyolefin composition (PO) of the $2^{nd}$ or $3^{rd}$ embodiment has an intrinsic viscosity (IV) in the range of 1.80 to 3.30 dl/g, wherein preferably the amount of the xylene cold soluble (XCS) fraction of the polyolefin composition (PO) is in the range of 28 to 45 wt.-%.

In the following the preferred embodiments of the $1^{st}$ to $3^{rd}$ embodiment are described together.

Preferably the heterophasic propylene copolymer (HECO) has a melt flow rate $MFR_2$ (230° C.) measured according to ISO 1133 in the range of 15 to 55 g/10 min and/or a comonomer content in the range of 10.0 to 28.0 mol-%.

In a preferred embodiment the polyolefin composition (PO) has a comonomer content in the range of in the range of 25 to 60 mol-% and/or a melt flow rate $MFR_2$ (230° C.) measured according to ISO 1133 in the range of 5 to 30 g/10 min.

Still more preferably the xylene cold soluble (XCS) fraction of the polyolefin composition (PO) has a comonomer content in the range of 21 to 55 mol-%;

In a preferred embodiment the (semi)crystalline polypropylene (PP) of the heterophasic propylene copolymer (HECO) is a (semi)crystalline propylene homopolymer (H-PP) preferably having a xylene cold soluble (XCS) traction of less than 4.5 wt.-% and/or the elastomeric propylene copolymer (EPC) of the heterophasic propylene copolymer (HECO) is an ethylene propylene rubber (EPR). Yet more preferably the weight ratio between the heterophasic propylene copolymer (HECO) and the polar modified a-polyolefin (PMP) is in the range of 4/1 to 85/1.

Additionally or alternatively to the previous paragraph, the polyolefin composition (PO) comprises
(a) 60 to 99 wt.-%, based on the total weight of the polyolefin composition (PO), of the heterophasic propylene copolymer (HECO); and
(b) at least 1 wt.-%, based on the total weight of the polyolefin composition (PO), of the polar modified α-polyolefin (PMP).

It is preferred that the polar modified α-polyolefin (PMP) has a melt flow rate $MFR_2$ (230° C.) measured according to ISO 1133 in the range of 0.5 to 10 g/10 min In a preferred embodiment the polar modified α-polyolefin (PMP) is a α-polyolefin (PMP) grafted with maleic anhydride, preferably the maleic anhydride content of the polar modified α-polyolefin (PMP) is in the range of 0.1 to 5.0 wt.

Still more preferred the α-polyolefin (pre-PMP) to be modified is an elastomeric ethylene copolymer (EEC) preferably having comonomer content of below 45 mol-%.

In a specific embodiment of the present invention the polyolefin composition (PO) has
(a) a tensile modulus of at least 700 MPa,
and/or
(b) an impact strength at 23° C. of at least 40 kJ/m$^2$,
and/or
(c) a shrinkage in flow (sector, radius 300 mm, opening angle 20°) of below 1.50%.

The present invention is also directed to an automotive article comprising a polyolefin composition (PO) according to this invention. Preferably said automotive article is an exterior automotive article.

Further the present invention is also directed to a process for the preparation of the polyolefin composition (PO) according to this invention by extruding the heterophasic propylene copolymer (HECO) and the polar modified α-polyolefin (PMP) in an extruder.

Preferably the heterophasic propylene copolymer (HECO) is obtained by producing the (semi)crystalline polypropylene (PP) in a first reaction zone comprising at least one reactor, transferring said (semi)crystalline polypropylene (PP) in a subsequent reaction zone comprising at least one reactor, where in the presence of the (semi)crystalline polypropylene (PP) the elastomeric propylene copolymer (EPC) is produced.

In the following the invention is described in more detail, i.e. all three embodiments ($1^{st}$ to $3^{rd}$ embodiment) are described together.

The Polyolefin Composition (PO)

The polyolefin composition (PO) of the present invention must comprise the heterophasic propylene copolymer (HECO) and the polar modified α-polyolefin (PMP). In addition the composition may comprise α-nucleating agents (NU) and additives (AD).

Preferably the weight ratio between the heterophasic propylene copolymer (HECO) and the polar modified α-polyolefin (PMP) [(HECO)/(PMP)] is in the range of 4/1 to 85/1, more preferably in the range of 5/1 to 50/1, yet more preferably in the range of 6/1 to 40/1, still more preferably in the range of 7/1 to 30/1, like in the range of 7/1 to 25/1.

Still more preferably the weight ratio between the between the xylene cold soluble (XCS) fraction of the heterophasic propylene copolymer (HECO) and the polar modified α-polyolefin (PMP) [(XCS)/(PMP)] is above 1.5, more preferably in the range of above 1.5 to 10.0, still more preferably in the range of 1.8 to 8.0.

Accordingly in one embodiment the heterophasic propylene copolymer (HECO) and the polar modified α-polyolefin (PMP) make up together at least 80 wt.-%, more preferably at least 85 wt.-%, yet more preferably at least 90 wt.-%, like at least 95 wt.-%, based on the total weight of the polyolefin composition (PO), of the polyolefin composition (PO).

Further, according to this invention, the α-nucleating agent (NU) is not an additive (AD). Accordingly it is preferred that the polyolefin composition (PO) contains up to 5.0 wt.-%, preferably $1.0 \times 10^{-5}$ to 4.0 wt.-%, more preferably $2.0 \times 10^{-5}$ to 2.0 wt.-%, based on the total weight of the polyolefin composition (PO), of α-nucleating agents (NU) and/or up to 8.0 wt.-%, preferably 0.1 to 6.0 wt.-%, more preferably 0.5 to 4.0 wt.-%, based on the total weight of the polyolefin composition (PO), of additives (AD).

Accordingly in one specific embodiment the polyolefin composition (PO) consists of the heterophasic propylene copolymer (HECO) and the polar modified α-polyolefin (PMP) and the optional α-nucleating agents (NU) and/or additives (AD).

Thus the present invention preferably is directed to a polyolefin composition (PO) ($1^{st}$ embodiment) comprising
(a) at least 60 wt.-%, more preferably in the range of 60 to 99 wt.-%, still more preferably in the range of 70 to 98 wt.-%, based on the total weight of the polyolefin composition (PO), of the heterophasic propylene copolymer (HECO) as defined herein; and
(b) at least 1 wt.-%, more preferably in the range of 1 to 40 wt.-%, still more preferably in the range of 2 to 30 wt.-%, based on the total weight of the polyolefin composition (PO), of the polar modified α-polyolefin (PMP).

Preferably said polyolefin composition (PO) is free of inorganic filler (F).

Accordingly, in one specific embodiment (1' embodiment) the polyolefin composition (PO) consists of
(a) at least 60 wt.-%, more preferably in the range of 60 to 99 wt.-%, still more preferably in the range of 70 to 98 wt.-%, based on the total weight of the polyolefin composition (PO), of the heterophasic propylene copolymer (HECO) as defined herein;
(b) at least 1 wt.-%, more preferably in the range of 1 to 40 wt.-%, still more preferably in the range of 2 to 30 wt.-%, based on the total weight of the polyolefin composition (PO), of the polar modified α-polyolefin (PMP);
(c) optionally up to 5.0 wt.-%, preferably in the range of $1.0 \times 10^{-5}$ to 4.0 wt.-%, more preferably in the range of $2.0 \times 10^{-5}$ to 2.0 wt.-%, based on the total weight of the polyolefin composition (PO), of α-nucleating agents (NU); and
(d) optionally up to 8.0 wt.-%, preferably in the range of 0.1 to 6.0 wt.-%, more preferably in the range of 0.5 to 4.0 wt.-%, based on the total weight of the polyolefin composition (PO), of additives (AD).

In another embodiment ($2^{nd}$ embodiment) the polyolefin composition (PO) may comprise in addition inorganic filler (F). Accordingly the polyolefin composition (PO) may comprise
(a) at least 60 wt.-%, more preferably in the range of 60 to 99 wt.-%, still more preferably in the range of 70 to 98 wt.-%, based on the total weight of the polyolefin composition (PO), of the heterophasic propylene copolymer (HECO) as defined herein;
(b) at least 1 wt.-%, more preferably in the range of 1 to 40 wt.-%, still more preferably in the range of 2 to 30 wt.-%, based on the total weight of the polyolefin composition (PO), of the polar modified α-polyolefin (PMP); and
(c) optionally at least 5 wt.-%, more preferably in the range of 5 to 20 wt.-%, still more preferably in the range of 7 to 15 wt.-%, based on the total weight of the polyolefin composition (PO), of the inorganic filler (F).

Accordingly, in one specific embodiment (2$^{nd}$ embodiment) the polyolefin composition (PO) consists of
(a) at least 60 wt.-%, more preferably in the range of 60 to 99 wt.-%, still more preferably in the range of 70 to 98 wt.-%, based on the total weight of the polyolefin composition (PO), of the heterophasic propylene copolymer (HECO) as defined herein;
(b) at least 1 wt.-%, more preferably in the range of 1 to 40 wt.-%, still more preferably in the range of 2 to 30 wt.-%, based on the total weight of the polyolefin composition (PO), of the polar modified α-polyolefin (PMP);
(c) optionally at least 5 wt.-%, more preferably in the range of 5 to 20 wt.-%, still more preferably in the range of 7 to 15 wt.-%, based on the total weight of the polyolefin composition (PO), of the inorganic filler (F);
(d) optionally up to 5.0 wt.-%, preferably in the range of $1.0 \times 10^{-5}$ to 4.0 wt.-%, more preferably in the range of $2.0 \times 10^{-5}$ to 2.0 wt.-%, based on the total weight of the polyolefin composition (PO), of α-nucleating agents (NU); and
(e) optionally up to 8.0 wt.-%, preferably in the range of 0.1 to 6.0 wt.-%, more preferably in the range of 0.5 to 4.0 wt.-%, based on the total weight of the polyolefin composition (PO), of additives (AD).

Preferably the polyolefin composition (PO) has a melt flow rate MFR$_2$ (230° C.) measured according to ISO 1133 in the range of 5 to 30 g/10 min, more preferably in the range of 7 to 25 g/10 min, still more preferably in the range of 9 to 22 g/10 min.

It s further preferred that the polyolefin composition (PO), preferably the polyolefin composition (PO) without filler (F), has a xylene cold soluble (XCS) fraction in the range of 27 to 45 wt.-%, more preferably in the range of 30 to 42 wt.-%, more preferably n the range of 32 to 40 wt-%.

In one specific embodiment the xylene cold soluble (XCS) fraction of the polyolefin composition (PO) has a comonomer content, preferably a content of ethylene and/or C4 to C12 a-olefin, more preferably an ethylene content, in the range of in the range of 20 to 60 mol-%, more preferably n the range of 21 to 55 mol-%, still more preferably 35 to 55 mol-%, like in the range of 40 to 52 mol-%.

Alternatively or additionally to the previous paragraph the xylene cold soluble (XCS) fraction of the polyolefin composition (PO) has intrinsic viscosity (IV) in the range of 1.8 to 3.3 dl/g, more preferably in the range of 1.9 to 3.0 dl/g, like in the range of 1.9 to 2.8 dl/g.

In a specific embodiment of the present invention the polyolefin composition (PO) has
(a) an impact strength at 23° C. of at least 40 kJ/m$^2$, more preferably in the range of 40 to 75 kJ/m$^2$, still more preferably in the range of 45 to 70 kJ/m$^2$.
and/or
(b) an impact strength at −20° C. of at least 5.5 kJ/m$^2$, more preferably in the range of 5.5 to 30 kJ/m$^2$, still more preferably in the range of 6.0 to 25 kJ/m$^2$.

In addition to the previous paragraph it is preferred that the polyolefin composition (PO) has a tensile modulus of at least 700 MPa, more preferably in the range of 700 to 1100 MPa, still more preferably in the range of 800 to 1000 MPa.

Additionally or alternatively to the two previous paragraphs it is preferred that the polyolefin composition (PO) has
(a) a shrinkage in flow (sector, radius 300 mm, opening angle 20°)) of below 1.50%, more preferably in the range of 0.50 to 1.30%, yet more preferably in the range of 0.60 to 1.20%;
and/or
(b) a shrinkage across flow (sector, radius 300 mm, opening angle 20°)) of below 1.50%, more preferably in the range of 0.50 to 1.50%, yet more preferably in the range of 0.70 to 1.30%.

In a further embodiment it is preferred that the polyolefin composition (PO) has a coefficient of linear thermal expansion (CLTE) performed in a temperature range from −30 to +80° C. of not more than 105 μm/mK, more preferably in the range of 70 to 105 μm/mK, yet more preferably in the range of 80 to 102 μm/mK, like in the range of 85 to 100 μm/mK.

In the following the properties of the components present in the polyolefin composition (PO) will be described in more detail.

The Heterophasic Propylene Copolymer (HECO)

The heterophasic propylene copolymer (HECO) according to this invention comprises a (semi)crystalline polypropylene (PP) as a matrix in which an elastomeric propylene copolymer (EPC) is dispersed. The expression "heterophasic propylene copolymer" or "heterophasic" as used in the instant invention indicates that the elastomeric propylene copolymer (EPC) is (finely) dispersed in the (semi)crystalline polypropylene (PP). In other words the (semi)crystalline polypropylene (PP) constitutes a matrix in which the elastomeric propylene copolymer (EPC) forms inclusions in the matrix, i.e. in the (semi)crystalline polypropylene (PP). Thus the matrix contains (finely) dispersed inclusions being not part of the matrix and said inclusions contain the elastomeric propylene copolymer (EPC). The term "inclusion" according to this invention shall preferably indicate that the matrix and the inclusion form different phases within the heterophasic composition (HECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

The heterophasic propylene copolymer (HECO) preferably has a melt flow rate MFR$_2$ (230° C., 2.16 kg) in the range of 15 to 55 g/10 min, more preferably in the range of 18 to 40 g/10 min, yet more preferably in the range of 20 to 35 g/10 min, like in the range of 20 to 30 g/10 min.

As mentioned above, the heterophasic propylene copolymer (HECO) according to this invention preferably comprises
(a) a (semi)crystalline polypropylene (PP) as the matrix (M) and
(b) an elastomeric propylene copolymer (EPC).

Preferably the weight ratio between the (semi)crystalline polypropylene (PP) and the elastomeric propylene copolymer (EPC) [PP/EPC] of the heterophasic propylene copolymer (HECO) is n the range of 50/50 to 85/15, more preferably in the range of 60/40 to 80/20.

Preferably, the heterophasic propylene copolymer (HECO) has a comonomer content, preferably a content of ethylene and/or $C_4$ to $C_{12}$ α-olefin, more preferably an ethylene content, in the range of 10 to 30 mol.-%, more preferably in the range of 12 to 27 mol-%, still more preferably in the range of 14 to 25 mol.-%.

The heterophasic propylene copolymer (HECO) has a xylene cold soluble (XCS) fraction (25° C.) in the range of 25 to 40 wt.-%, preferably in the range of 25 to 38 wt.-%, more preferably in the range of 25 to 35 wt.-%.

The comonomer content, preferably the content of ethylene and/or $C_4$ to $C_{12}$ α-olefin, more preferably the content of ethylene, of the xylene cold soluble fraction (XCS) of the heterophasic propylene copolymer (HECO) is in the range of 21 to 55 mol.-%, preferably in the range of 25 to 53 mol.-%, more preferably in the range of 30 to 52 mol-%, still more preferably in the range of 35 to 50 mol.-%, yet more preferably in the range of 40 to 50 mol.-% like in the range of 45 to 50 mol.-%.

Accordingly it is preferred that the heterophasic propylene copolymer (HECO) complies with the inequation (1), more preferably with in-equation (1a). still more preferably with in-equation (1b), yet more preferably with in-equation (1c), $$\frac{C2\,(XCS)}{C2\,(T)} \geq 1.5 \tag{1}$$

$$1.5 \leq \frac{C2\,(XCS)}{C2(T)} \leq 4.0 \tag{1a}$$

$$1.8 \leq \frac{C2\,(XCS)}{C2\,(T)} \leq 3.5 \tag{1b}$$

$$2.0 \leq \frac{C2\,(XCS)}{C2\,(T)} \leq 3.3 \tag{1c}$$

wherein
C2 (XCS) is the comonomer content, preferably the content of ethylene and/or $C_4$ to $C_{12}$ α-olefin, more preferably the content of ethylene, of the xylene cold soluble (XCS) fraction [in mol % of the xylene cold soluble (XCS) fraction];
C2 (T) is the comonomer content, preferably the content of ethylene and/or $C_4$ to $C_{12}$ α-olefin, more preferably the content of ethylene, of heterophasic propylene copolymer (HECO) [in mol % of the heterophasic propylene copolymer (HECO)].

The intrinsic viscosity (IV) of the xylene cold soluble fraction (XCS) of the heterophasic propylene copolymer (HECO) is in the range of 1.50 to 3.00 dl/g, preferably in the range of 1.70 to 2.50 dl/g, more preferably in the range of 1.80 to 2.20 dl/g.

Further it s preferred that the xylene cold insoluble fraction (XCI) of the heterophasic propylene copolymer (HECO) has an intrinsic viscosity (IV) in the range of 1.00 to 1.30 dl/g, more preferably n the range of 1.10 to 1.28 dl/g, still more preferably n the range of 1.20 to 1.26 dl/g.

Accordingly it is especially preferred that the heterophasic propylene copolymer (HECO) complies with the in-equation (2), more preferably with in-equation (2a), still more preferably with in-equation (2b), yet more preferably with in-equation (2c), $$1.00 \leq \frac{IV\,(XCS)}{IV\,(XCI)} \leq 2.00 \tag{2}$$

$$1.20 \leq \frac{IV\,(XCS)}{IV\,(XCI)} \leq 1.90 \tag{2a}$$

$$1.30 \leq \frac{IV\,(XCS)}{IV\,(XCI)} \leq 1.85 \tag{2b}$$

$$1.40 \leq \frac{IV\,(XCS)}{IV\,(XCI)} \leq 1.80 \tag{2c}$$

wherein
IV (XCS) is the intrinsic viscosity (IV) [dl/g] of the xylene cold soluble (XCS) fraction of the heterophasic propylene copolymer (HECO), and
IV (XCI) is the intrinsic viscosity (IV) [dl/g] of the xylene cold insoluble (XCI) fraction of the heterophasic propylene copolymer (HECO).

The (semi)crystalline polypropylene (PP) is preferably a (semi)crystalline random propylene copolymer (R-PP) or a (semi)crystalline propylene homopolymer (H-PP), the latter especially preferred.

The expression "propylene homopolymer" used in the instant invention relates to a polypropylene that consists substantially, i.e. of more than 99.70 mol-%, still more preferably of at least 99.80 mol-%, of propylene units. In a preferred embodiment only propylene units in the propylene homopolymer are detectable.

In case the (semi)crystalline polypropylene (PP) is a (semi)crystalline random propylene copolymer (R-PP) it is appreciated that the (semi)crystalline random propylene copolymer (R-PP) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the (semi)crystalline random propylene copolymer (R-PP) according to this invention comprises, especially consists of, monomers co-polymerizable with propylene from the group consisting of ethylene, 1-butene and 1-hexene. More specifically the (semi)crystalline random propylene copolymer (R-PP) of this invention comprises—apart from propylene—units derivable from ethylene and/or 1-butene. In a preferred embodiment the (semi)crystalline random propylene copolymer (R-PP) comprises units derivable from ethylene and propylene only.

Additionally it is appreciated that the (semi)crystalline random propylene copolymer (R-PP) has preferably a co-monomer content in the range of more than 0.30 to 3.0 mol-%, more preferably in the range of more than 0.35 to 2.5 mol-%, yet more preferably in the range of 0.40 to 2.0 mol-%.

The term "random" indicates in the present invention that the co-monomers of the (semi)crystalline random propylene copolymers are randomly distributed within the propylene copolymer. The term random is understood according to IUPAC (Glossary of basic terms in polymer science; IUPAC recommendations 1996).

As will be explained below, the heterophasic propylene copolymer (HECO) can be produced by blending the (semi) crystalline polypropylene (PP) and the elastomeric propylene copolymer (EPC). However, it is preferred that the heterophasic propylene copolymer (HECO) is produced in a sequential step process, using reactors in serial configuration and operating at different reaction conditions. Typically the (semi)crystalline polypropylene (PP) is produced in a first reactor system comprising at least one reactor and subsequently the elastomeric propylene copolymer (EPC) in a second reactor system comprising at least one reactor.

According to this invention the (semi)crystalline polypropylene (PP), like (semi)crystalline propylene homopolymer (H-PP), has a melt flow rate MFR$_2$ (230° C.) measured according to ISO 1133 of 45 to 150 g/10 min, more preferably of 48 to 100 g/10 min, still more preferably of 50 to 80 g/10 min, like in the range of 52 to 70 g/10 min.

Accordingly it is preferred that the heterophasic propylene copolymer (HECO) complies with the in-equation (3), more preferably with in-equation (3a). still more preferably with in-equation (3b), yet more preferably with in-equation (3c), $$\frac{MFR(M)}{MFR(T)} \leq 4.0 \tag{3}$$

$$1.0 \leq \frac{MFR(M)}{MFR(T)} \leq 3.8 \tag{3a}$$

$$1.4 \leq \frac{MFR(M)}{MFR(T)} \leq 3.5 \tag{3b}$$

$$1.7 \leq \frac{MFR(M)}{MFR(T)} 3.0 \tag{3c}$$

wherein
MFR (M) is the melt flow rate MFR$_2$ (230° C.) measured according to ISO 1133 (g/10 min) of the (semi)crystalline polypropylene (PP);
MFR (T) is the melt flow rate MFR$_2$ (230° C.) measured according to ISO 1133 (g/10 min) of the heterophasic propylene copolymer (HECO).

The term "(semi)crystalline" indicates in the present invention that the polymer is not amorphous. Accordingly it is preferred that the (semi)crystalline polypropylene (PP) according to this invention has a xylene cold soluble fraction (XCS) of not more than 10 wt.-%, in case of a (semi) crystalline propylene homopolymer (H-PP) the xylene cold soluble fraction (XCS) is even lower, i.e. not more than 6.0 wt.-%, more preferably not more than 4.5 wt.-%, like not more than 3.5 wt.-%.

Accordingly it is preferred that the (semi)crystalline propylene homopolymer (H-PP) has a xylene soluble fraction (XCS) of below 5.0 wt.-%, more preferably in the range of 0.5 to 4.5 wt.-%, like in the range of 1.0 to 3.8 wt.-%.

The second component of the heterophasic propylene copolymer (HECO) is the elastomeric propylene copolymer (EPC).

Preferably said elastomeric propylene copolymer (EC) comprises units derived from
propylene and
ethylene and/or C$_4$ to C$_{12}$ α-olefin.

The elastomeric propylene copolymer (EPC) comprises, preferably consists of, units derivable from (i) propylene and (ii) ethylene and/or at least another C$_4$ to C$_{12}$ α-olefin, like C$_4$ to C10 α-olefin, more preferably units derivable from (i) propylene and (ii) ethylene and/or at least another α-olefin selected form the group consisting of 1-butene, 1-pentene, 1-hexene, 1-heptene and 1-octene. The elastomeric propylene copolymer (EPC) may additionally contain units derived from a conjugated diene, like butadiene, or a non-conjugated diene, however it is preferred that the elastomeric propylene copolymer (EPC) consists of units derivable from (i) propylene and (ii) ethylene and/or C$_4$ to C$_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane.

Accordingly the elastomeric propylene copolymer (EPC) comprises at least units derivable from propylene and ethylene and may comprise other units derivable from a further α-olefin as defined in the previous paragraph. However, it is in particular preferred that elastomeric propylene copolymer (EPC) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM) and/or an ethylene propylene rubber (EPR) as elastomeric propylene copolymer (EPC) is especially preferred, the latter most preferred.

As mentioned above the heterophasic propylene copolymer (HECO) can be produced by blending the (semi)crystalline polypropylene (PP) and the elastomeric propylene copolymer (EPC). However, it is preferred that the heterophasic propylene copolymer (HECO) is produced in a sequential step process, using reactors in serial configuration and operating at different reaction conditions. As a consequence, each fraction prepared in a specific reactor may have its own molecular weight distribution and/or comonomer content distribution.

The heterophasic propylene copolymer (HECO) according to this invention is preferably produced in a sequential polymerization process, i.e. in a multistage process, known in the art, wherein the (semi)crystalline polypropylene (PP) is produced at least in one slurry reactor, preferably in a slurry reactor and optionally in a subsequent gas phase reactor, and subsequently the elastomeric propylene copolymer (EPC) is produced at least in one, i.e. one or two, gas phase reactor(s).

Accordingly the heterophasic propylene copolymer (HECO) is obtained by producing the (semi)crystalline polypropylene (PP) in a first reaction zone comprising at least one reactor. Transferring said (semi)crystalline polypropylene (PP) in a subsequent reaction zone comprising at least one reactor where in the presence of the (semi)crystalline polypropylene (PP) the elastomeric propylene copolymer (EPC) is produced.

Accordingly it is preferred that the heterophasic propylene copolymer (HECO) is produced in a sequential polymerization process comprising the steps of
(a) polymerizing propylene and optionally at least one ethylene and/or C$_4$ to C$_{12}$ α-olefin in a first reactor (R1) obtaining the first polypropylene fraction of the (semi) crystalline polypropylene (PP), preferably said first polypropylene fraction is a propylene homopolymer,
(b) transferring the first polypropylene fraction into a second reactor (R2),
(c) polymerizing in the second reactor (R2) and in the presence of said first polypropylene fraction propylene and optionally at least one ethylene and/or C$_4$ to C$_{12}$ α-olefin obtaining thereby the second polypropylene fraction, preferably said second polypropylene fraction is a second propylene homopolymer, said first polypropylene fraction and said second polypropylene fraction form the (semi)crystalline polypropylene (PP), i.e. the matrix of the heterophasic propylene copolymer (HECO),
(d) transferring the (semi)crystalline polypropylene (PP) of step (c) into a third reactor (R3), (e) polymerizing in the third reactor (R3) and in the presence of the (semi)crystalline polypropylene (PP) obtained in step (c) propylene and at least one ethylene and/or $C_4$ to $C_{12}$ α-olefin obtaining thereby the first elastomeric fraction of the elastomeric propylene copolymer (EPC), (f) transferring the (semi)crystalline polypropylene (PP) and the first elastomeric fraction of the elastomeric propylene copolymer (EPC) of step (e) into a fourth reactor (R4), (g) polymerizing in the fourth reactor (R4) and in the presence of the (semi)crystalline polypropylene (PP) and the first elastomeric fraction a second fraction of the elastomeric propylene copolymer (EPC) obtaining thereby the elastomeric propylene copolymer (EPC) being dispersed in the (semi)crystalline polypropylene (PP), i.e. obtaining thereby the heterophasic propylene copolymer (HECO).

Of course, in the first reactor (R1) the second polypropylene fraction can be produced and in the second reactor (R2) the first polypropylene fraction can be obtained.

Preferably between the second reactor (R2) and the third reactor (R3) the monomers are flashed out.

The term "sequential polymerization process" indicates that the heterophasic propylene copolymer (HECO) is produced in at least two, like three or four reactors connected in series. Accordingly the present process comprises at least a first reactor (R1) and a second reactor (R2), more preferably a first reactor (R1), a second reactor (R2) and a third reactor (R3) or a first reactor (R1), a second reactor (R2), a third reactor (R3) and fourth reactor (R4). The term "polymerization reactor" shall indicate that the main polymerization takes place. Thus in case the process consists of three or four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3), preferably in the second gas phase reactor (GPR-2), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the heterophasic propylene copolymer (HECO) is prepared by
a) reacting a spray crystallized or emulsion solidified adduct of $MgCl_2$ and a $C_1$-C2 alcohol with $TiCl_4$
b) reacting the product of stage a) with a dialkylphthalate of formula (I)

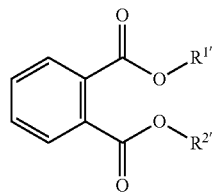

(I)

wherein $R^{1'}$ and $R^{2'}$ are independently at least a C5 alkyl
under conditions where a transesterification between said $C_1$ to C2 alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of
  adding to said titanised carrier
  (i) a dialkylphthalate of formula (I) with $R^{1'}$ and $R^{2'}$ being independently at least a $C_5$-alkyl, like at least a $C_8$-alkyl,
  or preferably
  (ii) a dialkylphthalate of formula (I) with $R^{1'}$ and $R^{2'}$ being the same and being at least a $C_5$-alkyl, like at least a $C_8$-alkyl,
  or more preferably
  (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

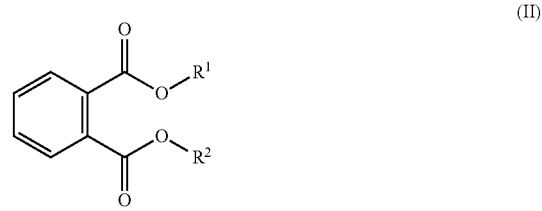

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic propylene copolymer (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \quad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \quad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [$Si(OCH_3)_2(cyclo-pentyl)_2$], diisopropyl dimethoxy silane [$Si(OCH_3)_2(CH(CH_3)_2)_2$].

Most preferably the external donor is dicyclopentyl dimethoxy silane [$Si(OCH_3)_2(cyclo-pentyl)_2$].

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of heterophasic propylene copolymer (HECO) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Polar Modified α-Polyolefin (PMP)

The polar modified α-polyolefin (PMP) is a polyolefin on which reactive polar groups are bonded. Preferably said reactive polar groups have a low molecular weight.

Preferably the polyolefin of the polar modified α-polyolefin (PMP) is an elastomeric propylene copolymer (EPC1) or an elastomeric ethylene copolymer (EEC), the latter being preferred.

In case the polyolefin of the polar modified α-polyolefin (PMP) is an elastomeric propylene copolymer (EPC1) it is required that it is chemically different to the elastomeric propylene copolymer (EPC) of the heterophasic propylene copolymer (HECO).

The elastomeric ethylene copolymer (EEC) as the polyolefin of the polar modified α-polyolefin (PMP) comprises monomers co-polymerizable with ethylene, for example co-monomers such as propylene and/or $C_4$ to $C_{12}$ α-olefins, in particular propylene and/or $C_4$ to $C_8$ α-olefins, e.g. 1-butene, 1-hexene and/or 1-octene. Preferably the elastomeric ethylene copolymer (EEC) comprises, especially consists of, monomers co-polymerizable with ethylene from the group consisting of propylene, 1-hexene and 1-octene. More specifically the elastomeric ethylene copolymer (EEC) comprises—apart from ethylene—units derivable from propylene and/or 1-octene. In a preferred embodiment the elastomeric ethylene copolymer (EEC) comprises units derivable from ethylene and propylene only.

Preferably the comonomer content, more preferably the content of propylene and/or $C_4$ to $C_{12}$ α-olefin, yet more preferably the content of propylene, of the elastomeric ethylene copolymer (EEC) is less than 85 mol-%, more preferably equal or less than 44 mol.-%, still more preferably in the range of 8 to below 80 mol-%, yet more preferably in the range of 20 to equal or below 75 mol.-%, still yet more preferably in the range of 25 to 70 mol.-%, like in the range of 30 to 65 mol.-%.

In terms of structure, the polar modified α-polyolefin (PMP) is preferably a grafted α-polyolefin, like a grafted elastomeric propylene copolymer (EPC1) or a grafted elastomeric ethylene copolymer (EEC), the latter being preferred.

In this context, preference is given to a polar modified α-polyolefin (PMP), like a polar modified elastomeric ethylene copolymer (EEC), containing groups derived from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, acrylic acid, maleic acid, fumaric acid, itaconic acid and mixtures thereof.

Particular preference is given to use a α-polyolefin, like an elastomeric ethylene copolymer (EEC), grafted with maleic anhydride or acrylic acid as the polar modified α-polyolefin (PMP).

The polar modified α-polyolefin (PMP) can be produced in a simple manner by reactive extrusion of the polymer, for example with maleic anhydride or acrylic acid in the presence of free radical generators (like organic peroxides), as disclosed for instance in U.S. Pat. Nos. 4,506,056, 4,753,997 or EP 1 805 238.

Preferred amounts of groups derived from polar compounds in the polar modified α-polyolefin (PMP), like in the polar modified elastomeric ethylene copolymer (EEC), are from 0.1 wt.-% to 5.0 wt.-%, based on the total weight of the polar modified α-polyolefin (PMP). For example, in the range of 0.2 to 4.0 wt.-%, preferable in the range of 0.3 to 3.5 wt.-%, more preferably in the range of 0.4 to 3.0 wt.-% and most preferably in the range of 0.5 to 2.5 wt.-%, based on the total weight of the polar modified α-polyolefin (PMP).

Preferably the polar modified α-polyolefin (PMP), like the polar modified elastomeric ethylene copolymer (EEC), has a melt flow rate MFR$_2$ (230° C.) measured according to ISO 1133 in the range of 0.5 to 10 g/10 min, more preferably in the range of 0.8 to 8.0 g/10 min, still more preferably in the range of 1.0 to 6.0 g/10 min.

In a preferred embodiment the polar modified α-polyolefin (PMP) is a maleic anhydride modified elastomeric ethylene copolymer (EEC) containing 0.1 to 5.0 wt.-% (e.g. 0.2 to 4.0 wt.-%), preferable in the range of 0.3 to 3.5 wt.-%, more preferably in the range of 0.4 to 3.0 wt.-% and most preferably in the range of 0.5 to 2.5 wt.-%, based on the total weight of the maleic anhydride modified elastomeric ethylene copolymer (EEC), of maleic anhydride. Further the elastomeric ethylene copolymer (EEC) of said maleic anhydride modified elastomeric ethylene copolymer (EEC) is an elastomeric ethylene propylene copolymer (PER) containing 20 to equal or below 75 mol.-%, still yet more preferably in the range of 25 to 70 mol.-%, like in the range of 30 to 65 mol.-%, of propylene. Additionally it is preferred that said maleic anhydride modified elastomeric ethylene copolymer (EEC) has a melt flow rate MFR$_2$ (230° C.) measured according to ISO 1133 in the range of 0.5 to 10 g/10 min, more preferably in the range of 0.8 to 8.0 g/10 min, still more preferably in the range of 1.0 to 6.0 g/10 min.

The Inorganic Filler (F)

As mentioned above the polyolefin composition (PO) according to this invention may comprise inorganic filler (F). Thus, the filler (F) is not regarded as being encompassed by the additives (AD) defined in more detail below.

Preferably inorganic filler (F) is mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite and talc. The most preferred the inorganic filler (F) is talc.

It is appreciated that the filler (F) has median particle size (D$_{50}$) in the range of 0.8 to 20 μm and a top cut particle size (D$_{95}$) in the range of 10 to 20 μm, preferably a median particle size (D$_{50}$) in the range of 5.0 to 8.0 μm and top cut particle size (D$_{95}$) in the range of 12 to 17 μm, more preferably a median particle size (D$_{50}$) in the range of 5.5 to 7.8 μm and top cut particle size (D$_{95}$) of 13 to 16.5 μm.

According to this invention the filler (F) does not belong to the class of alpha nucleating agents (NU) and additives (AD).

The filler (F) is state of the art and a commercially available product.

The Alpha Nucleating Agents (NU)

In one embodiment of the invention the polyolefin composition (PO) comprises α-nucleating agent, more preferably the composition is free of beta-nucleating agent.

According to this invention the α-nucleating agent (NU) is not an additive (AD).

The alpha-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and C$_1$-C$_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butyl-phenyl)phosphate], and
(iv) vinylcycloalkane polymer or vinylalkane polymer, and
(v) mixtures thereof.

Preferably α-nucleating agent comprised in the composition of the invention is vinylcycloalkane polymer and/or vinylalkane polymer, more preferably vinylcycloalkane polymer, like vinylcyclohexane (VCH) polymer. Vinyl cyclohexane (VCH) polymer is particularly preferred as α-nucleating agent. It is appreciated that the amount of vinylcycloalkane, like vinylcyclohexane (VCH), polymer and/or vinylalkane polymer, more preferably of vinylcyclohexane (VCH) polymer, in the polyolefin composition (PO) is not more than 500 ppm, preferably not more than 200 ppm, more preferably not more than 100 ppm, like in the range of 0.1 to 500 ppm, preferably in the range of 0.5 to 200 ppm, more preferably in the range of 1 to 100 ppm. Furthermore, it is appreciated that the vinylcycloalkane polymer and/or vinylalkane polymer is introduced into the polyolefin composition (PO) by the BNT technology. With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:

CH$_2$=CH—CHR$^3$R$^4$ wherein R$^3$ and R$^4$ together form a 5- or 6-membered saturated, unsaturated or aromatic ring or independently represent an alkyl group comprising 1 to 4 carbon atoms, and the modified catalyst is used for the preparation of the heterophasic propylene copolymer (HECO) present in the inventive polyolefine composition (PO). The polymerized vinyl compound acts as an alpha-nucleating agent. The weight ratio of vinyl compound to solid catalyst component in the modification step of the catalyst is preferably of up to 5 (5:1), more preferably up to 3 (3:1), like in the range of 0.5 (1:2) to 2 (2:1).

Such nucleating agents are commercially available and are described, for example, in "Plastic Additives Handbook", 5th edition, 2001 of Hans Zweifel (pages 967 to 990).

Additives (AD)

In addition to the heterophasic propylene copolymer (HECO), the polar modified α-polyolefin (PMP) and the optional inorganic filler (F) the polyolefin composition (PO) may include additives (AD). Typical additives are acid scavengers, antioxidants, colorants, light stabilisers, plasticizers, slip agents, anti-scratch agents, dispersing agents, processing aids, lubricants, pigments, and the like. As indicated above the inorganic filler (F) is not regarded as an additive (AD).

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials (PCM).

The Polymeric Carrier Material (PCM)

Preferably the polyolefin composition (PO) of the invention does not comprise (a) further polymer (s) different to the heterophasic propylene copolymer (HECO) and the polar modified α-polyolefin (PMP) in an amount exceeding 10 wt.-%, preferably in an amount exceeding 5 wt.-%, more preferably in an amount exceeding 3 wt.-%, based on the weight of the composition. If an additional polymer is present, such a polymer is typically a polymeric carrier material (PCM) for additives (AD). Any carrier material for additives (AD) is not calculated to the amount of polymeric compounds as indicated in the present invention, but to the amount of the respective additive.

The polymeric carrier material (PCM) is a carrier polymer for the other additives (AD) to ensure a uniform distribution in the composition of the invention. The polymeric carrier material (PCM) is not limited to a particular polymer. The polymeric carrier material (PCM) may be ethylene homopolymer, ethylene copolymer obtained from ethylene and α-olefin comonomer such as C3 to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The polyolefin composition (PO) of the present invention is preferably used for the production of articles, more preferably of moulded articles, yet more preferably of injection moulded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, more preferably molded articles, like injection molded articles, comprising, preferably comprising at least 60 wt.-%, more preferably at least 80 wt.-%, yet more preferably at least 95 wt.-%, like consisting of, the inventive polyolefin composition (PO). Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive polyolefin composition (PO).

The invention will be further defined by way of examples.

EXAMPLES

1. Definitions/Measuring Methods

The following definitions of terms and determination methods apply for the above general description of the invention as well as to the below examples unless otherwise defined.

Quantification of microstructure by NMR spectroscopy

Quantitative nuclear-magnetic resonance (NMR) spectroscopy was used to quantify the comonomer content of the polymers. Quantitative $^{13}C$ {$^1H$} NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C$ {$^1H$} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C${$^1H$} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T.

Macromolecules 15 (1982) 1150). This method was chosen for its robust nature and integration regions slightly adjusted to increase applicability to a wider range of comonomer contents.

The Maleic Anhydride Content was Determined by FTIR

For the FTIR measurement compression moulded films of 300 μm thickness (pressed at 190° C.) were used. FTIR was done in transmission mode.

The carbonyl group absorption peaks for both, maleic anhydride (MAH) and maleic acid show up at 1790 $cm^{-1}$ and 1712 $cm^{-1}$, respectively. In unmodified polypropylene this area of the spectra is relatively devoid of other peaks. Therefore the ranges for determination of the maleic anhydride content were set from 1815 $cm^{-1}$ to 1750 $cm^{-1}$. To quantify the amount of maleic anhydride present, a calibration curve was built with different concentrations of known MAH content. The curve was made up of 4 points: 0, 0.7, 1.05 and 1.4 wt % of MAH in isotactic propylene homopolymer. 0 wt % corresponds to the unmodified pure isotactic propylene homopolymer.

For the calculation of the MAH content, the spectra of the propylene homopolymer without MAH is subtracted from the substrate with the unknown MAH concentration. After baseline correction the peak area under 1790 $cm^{-1}$ (integration range as describe above) is integrated and divided by the sample thickness and multiplied with the slope from the calibration curve. Finally a correction factor which describes the deviation from the zero point needs to be considered.

$MFR_2$ (230° C.) is measured according to ISO 1133 (230° C., 2.16 kg load).

$MFR_2$ (190° C.) is measured according to ISO 1133 (190° C., 2.16 kg load).

Density is measured according to ISO 1183-1—method A (2004). Sample preparation is done by compression moulding in accordance with ISO 1872-2:2007.

Xylene cold soluble fraction (XCS wt.-%): Content of xylene cold solubles (XCS) is determined at 25° C. according ISO 16152; first edition; 2005 Jul. 1. The part which remains insoluble is the xylene cold insoluble (XCI) fraction.

Intrinsic viscosity is measured according to DIN ISO 1628/1, October 1999 (in Decalin at 135° C.).

The tensile modulus was measured according to ISO 527-2 (cross head speed=1 mm/min; 23° C.) using injection molded specimens as described in EN ISO 1873-2 (dog bone shape, 4 mm thickness). The measurement is done after 96 h conditioning time of the specimen.

Charpy notched impact strength is determined according to ISO 180/1A at 23° C. and −20° C. by using injection moulded test specimens as described in EN ISO 1873-2 (80×10×4 mm).

Median particle size ($D_{50}$) (Sedimentation) is calculated from the particle size distribution [mass percent] as determined by gravitational liquid sedimentation according to ISO 13317-3 (Sedigraph)

Cutoff particle size ($D_{95}$) (Sedimentation) is calculated from the particle size distribution [mass percent] as determined by gravitational liquid sedimentation according to ISO 13317-3 (Sedigraph)

Coefficient of linear thermal expansion: The coefficient of linear thermal expansion (CLTE) was determined in accordance with ISO 11359-2:1999 on 10 mm long pieces cut from the same injection molded specimens as used for the tensile modulus determination. The measurement was performed in a temperature range from −30 to +80° C. at a heating rate of 1° C./min and a temperature range from 23 to +80° C. at a heating rate of 1° C./min, respectively.

Shrinkage in flow and shrinkage cross flow were determined on film gate injection moulded discs: One is a sector (radius 300 mm and opening angle of 20°) and the other one a stripe (340×65 mm). The two specimens are injection moulded at the same time in different thicknesses and back pressures (2 mm and 300, 400, 500 bars; 2.8 mm and 300, 400, 500 bars; 3.5 mm and 300, 400, 500 bars). The melt temperature is 240° C. and the temperature of the tool 25° C. Average flow front velocity is 3.0±0.2 mm/s for the 2 mm tool, 3.5±0.2 mm/s for the 2.8 mm tool and 0±0.2 mm/s for the 3.5 mm tool.

After the injection moulding process the shrinkage of the specimens is measured at 23° C. and 50% humidity. The measurement intervals are 1, 4, 24, 48 and 96 hours after the injection moulding. To determine the shrinkage 83 and 71 measurement points (generated by eroded dots on the tool surface) of the sector and the stripe, respectively, are recorded with a robot. Both, in flow and cross flow shrinkage of the 2.8 mm thick plates exposed to a back pressure of 400 bars at 96 hours after the injection moulding process are reported as final results.

Examples

Preparation of HECOs 1 and 2

Catalyst for HECO1 and HECO2

First, 0.1 mol of $MgCL_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 0 491 566, EP 0 591 224 and EP 0 586 390.

The catalyst was further modified (VCH modification of the catalyst).

35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared above (Ti content 1.4 wt.-%) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

TABLE 1a

Polymerization of HECO1 and HECO2 (Part 1)

| | | HECO1 | HECO2 |
|---|---|---|---|
| Prepoly | | | |
| Residence time | [h] | 0.25 | 0.26 |
| Temperature | [° C.] | 27 | 28 |
| Co/ED ratio | [mol/mol] | 5.94 | 5.9 |
| Co/TC ratio | [mol/mol] | 184 | 221 |
| Loop (R1) | | | |
| Residence time | [h] | 0.26 | 0.4 |
| Temperature | [° C.] | 61 | 62 |
| $H_2/C_3$ ratio | [mol/kmol] | 13.9 | 10.6 |
| MFR | [g/10 min] | 63 | 54 |

TABLE 1a-continued

Polymerization of HECO1 and HECO2 (Part 1)

|  |  | HECO1 | HECO2 |
|---|---|---|---|
| XCS | [wt %] | 3.3 | 3.2 |
| C2 content | [mol %] | 0 | 0 |
| 1st GPR (R2) |  |  |  |
| Residence time | [h] | 0.09 | 0.1 |
| Temperature | [° C.] | 79 | 80 |
| Pressure | [kPa] | 15 | 15 |
| $H_2/C_3$ ratio | [mol/kmol] | 161 | 152 |
| MFR | [g/10 min] | 63 | 55 |
| XCS | [wt %] | 3.4 | 2.6 |
| C2 content | [mol %] | 0 | 0 |

TABLE 1b

Polymerization of HECO1 and HECO2 (Part 2)

|  |  | HECO1 | HECO2 |
|---|---|---|---|
| 2nd GPR (R3) |  |  |  |
| Residence time | [h] | 0.12 | 0.382 |
| Temperature | [° C.] | 60 | 60 |
| Pressure | [kPa] | 13 | 14 |
| $C_2/C_3$ ratio | [mol/kmol] | 548 | 552 |
| $H_2/C_2$ ratio | [mol/kmol] | 472 | 500 |
| MFR | [g/10 min] | 33 | 32 |

TABLE 1b-continued

Polymerization of HECO1 and HECO2 (Part 2)

|  |  | HECO1 | HECO2 |
|---|---|---|---|
| XCS | [wt %] | 22 | 20.4 |
| C2 content | [mol %] | 12.9 | 12.9 |
| 3rd GPR (R4) |  |  |  |
| Residence time | [h] | 0.12 | 0.84 |
| Temperature | [° C.] | 80 | 80 |
| Pressure | [kPa] | 1500 | 15 |
| $C_2/C_3$ ratio | [mol/kmol] | 549 | 549 |
| $H_2/C_2$ ratio | [mol/kmol] | 391 | 513 |
| Split (R1 + 2/R3 + 4) | [—] | 66.1/33.9 | 71.7/28.3 |
| $MFR_2$ | [g/10 min] | 23 | 29 |
| XCS | [wt %] | 32.8 | 26.1 |
| IV of XCI | [dl/g] | 1.22 | 1.24 |
| IV of XCS | [dl/g] | 2.12 | 1.98 |
| C2 of XCS | [mol %] | 49 | 48 |
| C2 content | [mol %] | 20.9 | 15.9 |

The HECOs 1 and 2 were mixed in a twin-screw extruder with 0.1 wt % of Pentaerythrityl-tetrakis(3-(3',5'-di-tert. butyl-4-hydroxyphenyl)-propionate, (CAS-no. 6683-19-8, trade name Irganox 1010) supplied by BASF AG, 0.1 wt % Tris (2,4-di-t-butylphenyl) phosphite (CAS-no. 31570-04-4, trade 10 name Irgafos 168) supplied by BASF AG, and 0.05 wt % Calcium stearate (CAS-no. 1592-23-0) supplied by Croda Polymer Additives.

The inventive and comparative compositions were melt blended on a co-rotating twin screw extruder.

TABLE 2

Properties of the examples

|  | Units | IE1 | IE2 | IE3 | CE1 | CE2 | CE3 |
|---|---|---|---|---|---|---|---|
| HECO1 | [wt.-%] | 96 | 90 | — | 100 | — | — |
| HECO2 | [wt.-%] | — | — | 88 | — | 100 | 90 |
| PMP | [wt.-%] | 4 | 10 | 12 | — | — | — |
| Plastomer | [wt.-%] | — | — | — | — | — | 10 |
| MFR | [g/10 min] | 14 | 10 | 17 | 23 | 27 | 28 |
| XCS | [wt.-%] | 35.0 | 38.0 | 34.9 | 32.6 | 26.1 | 34 |
| IV(XCS) | [dl/g] | 2.13 | 2.30 | 1.91 | 2.12 | 1.98 | 1.80 |
| C2(XCS) | [mol %] | 48.3 | 49.8 | 48.5 | 48.2 | 45.7 | 52 |
| SHif | [%] | 1.15 | 0.91 | 1.03 | 0.98 | 1.11 | 0.71 |
| SHaf | [%] | 1.33 | 1.12 | 1.26 | 1.16 | 1.33 | 0.92 |
| TM | [MPa] | 877 | 800 | 921 | 1007 | 1215 | 1010 |
| CHI(23) | [kJ/m²] | 56 | 61 | 47 | 28 | 8.6 | 35 |
| CHI(−20)0 | [kJ/m²] | 11 | 20 | 6 | 6.8 | 5 | 5 |
| CLTE23 | [μm/mK] | 112 | 112 | 115 | 121 | 119 | 106 |
| CLTE −30 | [μm/mK] | 99 | 98 | 100 | 106 | 104 | 94 |

SHif Shrinkage in flow

SHaf Shrinkage across flow

TM Tensile Modulus

CHI(23) Charpy impact strength at 23° C.

CHI(−20) Charpy impact strength at −20° C.

CLTE23 CLTE +23/80° C./MD

CLTE −30 CLTE −30/80° C./MD

PMP is the commercial maleic anhydride grafted ethylene propylene copolymer Exxelor VA 1803 of ExxonMobil having a density of 860 kg/m³ and a $MFR_2$ (230° C.) of 3.3 g/10 min. The anhydride content is 1.9 wt.-%. The propylene content of the ethylene propylene copolymer is 37.6 mol-%

Plastomer is the commercial ethylene-1-octene copolymer Engage 8407 of Dow having a density of 870 kg/mol, a 1-octene content of 14.2 mol-% and a $MFR_2$ (190° C.) of 30 g/10 min.

The invention claimed is:

1. A polyolefin composition (PO) comprising a heterophasic propylene copolymer (HECO) and a polar modified α-polyolefin (PMP), wherein said heterophasic propylene copolymer (HECO) comprises:
   (a) a (semi)crystalline polypropylene (PP) that is a (semi)crystalline propylene homopolymer (H-PP); and
   (b) an elastomeric propylene copolymer (EPC) dispersed in said (semi)crystalline polypropylene (PP);
   wherein said polyolefin composition (PO) has:
      (i) a xylene cold soluble (XCS) fraction in the range of 28 to 45 wt. %;
      wherein further the xylene cold soluble (XCS) fraction of said polyolefin composition has:
      (ii) an intrinsic viscosity (IV) in the range of 1.80 to 3.30 dl/g.

2. The polyolefin composition (PO) according to claim 1, wherein:
   (a) the intrinsic viscosity (IV) of the xylene cold insoluble (XCI) fraction of the heterophasic propylene copolymer (HECO) is in the range of 1.00 to 1.30 dl/g; and/or
   (b) the melt flow rate MFR$_2$ (230° C.) measured according to ISO 1133 of the (semi)crystalline polypropylene (PP) of the heterophasic propylene copolymer (HECO) is in the range of 45 to 150 g/10 min; and/or
   (c) the comonomer content of the xylene cold soluble (XCS) fraction of the heterophasic propylene copolymer (HECO) is in the range of 21 to 55 mol %; and/or
   (d) the intrinsic viscosity (IV) of the xylene cold soluble (XCS) fraction of the heterophasic propylene copolymer (HECO) is in the range of 1.50 to 3.00 dl/g.

3. A polyolefin composition (PO) comprising a heterophasic propylene copolymer (HECO) and a polar modified α-polyolefin (PMP), wherein said heterophasic propylene copolymer (HECO) comprises:
   (a) a (semi)crystalline polypropylene (PP) having a melt flow rate MFR$_2$ (230° C.) measured according to ISO 1133 in the range of 45 to 150 g/10 min, wherein the (semi)crystalline polypropylene (PP) is a (semi)crystalline propylene homopolymer (H-PP); and
   (b) an elastomeric propylene copolymer (EPC) dispersed in said (semi)crystalline polypropylene (PP);
   wherein said heterophasic propylene copolymer (HECO) has:
      (i) a xylene cold soluble (XCS) fraction in the range of 25 to 40 wt. %;
      wherein further the xylene cold soluble (XCS) fraction of said heterophasic propylene copolymer (HECO) has:
      (ii) a comonomer content in the range of 21 to 55 mol %; and
      (iii) optionally an intrinsic viscosity (IV) in the range of 1.50 to 3.00 dl/g,
      and optionally still further,
      (iv) the intrinsic viscosity (IV) of the xylene cold insoluble (XCI) fraction of the heterophasic propylene copolymer (HECO) is in the range of 1.00 to 1.30 dl/g.

4. A polyolefin composition (PO) comprising a heterophasic propylene copolymer (HECO) and a polar modified α-polyolefin (PMP), wherein said heterophasic propylene copolymer (HECO) comprises:
   (a) a (semi)crystalline polypropylene (PP) optionally having a melt flow rate MFR$_2$ (230° C.) measured according to ISO 1133 in the range of 45 to 150 g/10 min, wherein the (semi)crystalline polypropylene (PP) is a (semi)crystalline propylene homopolymer (H-PP); and
   (b) an elastomeric propylene copolymer (EPC) dispersed in said (semi)crystalline polypropylene (PP);
   wherein said heterophasic propylene copolymer (HECO) has:
      (i) a xylene cold soluble (XCS) fraction in the range of 25 to 40 wt. %;
      wherein further the xylene cold soluble (XCS) fraction of said heterophasic propylene copolymer (HECO) has:
      (ii) a comonomer content in the range of 21 to 55 mol %; and
      (iii) optionally an intrinsic viscosity (IV) in the range of 1.50 to 3.00 dl/g,
      and still further;
      (iv) the intrinsic viscosity (IV) of the xylene cold insoluble (XCI) fraction of the heterophasic propylene copolymer (HECO) is in the range of 1.00 to 1.30 dl/g.

5. The polyolefin composition (PO) according to claim 3, wherein:
   (a) said polyolefin composition (PO) has a xylene cold soluble (XCS) fraction in the range of 28 to 45 wt. %; and/or
   (b) the xylene cold soluble (XCS) fraction of said polyolefin composition (PO) has an intrinsic viscosity (IV) in the range of 1.80 to 3.30 dl/g.

6. The polyolefin composition (PO) according to claim 1, wherein the heterophasic propylene copolymer (HECO) has:
   (a) a melt flow rate MFR$_2$ (230° C.) measured according to ISO 1133 in the range of 15 to 55 g/10 min; and/or
   (b) a comonomer content in the range of 10.0 to 28.0 mol %.

7. The polyolefin composition (PO) according to claim 1, wherein:
   (a) the xylene cold soluble (XCS) fraction of said polyolefin composition (PO) has a comonomer content in the range of 21 to 55 mol %; and/or
   (b) said polyolefin composition (PO) has a comonomer content in the range of 25 to 60 mol %.

8. The polyolefin composition (PO) according claim 1, having a melt flow rate MFR$_2$ (230° C.) measured according to ISO 1133 in the range of 5 to 30 g/10 min.

9. The polyolefin composition (PO) according to claim 1, wherein the weight ratio between the (semi)crystalline polypropylene (PP) and the elastomeric propylene copolymer (EPC) of the heterophasic propylene copolymer (HECO) [(PP)/(EPC)] is in the range of 50/50 to 85/15.

10. The polyolefin composition (PO) according to claim 1, wherein:
    (a) the (semi)crystalline polypropylene (PP) of the heterophasic propylene copolymer (HECO) is a (semi)crystalline propylene homopolymer (H-PP) having a xylene cold soluble (XCS) fraction of less than 4.5 wt. %; and/or
    (b) the elastomeric propylene copolymer (EPC) of the heterophasic propylene copolymer (HECO) is an ethylene propylene rubber (EPR).

11. The polyolefin composition (PO) according to claim 1, wherein:
    (a) the weight ratio between the heterophasic propylene copolymer (HECO) and the polar modified α-polyolefin (PMP) is in the range of 4/1 to 85/1; and/or
    (b) said polyolefin composition (PO) comprises:
       (i) 60 to 99 wt. %, based on the total weight of the polyolefin composition (PO), of the heterophasic propylene copolymer (HECO); and (ii) at least 1 wt. %, based on the total weight of the polyolefin composition (PO), of the polar modified α-polyolefin (PMP).

12. The polyolefin composition (PO) according to claim 1, wherein the polar modified α-polyolefin (PMP) has a melt flow rate $MFR_2$ (230° C.) measured according to ISO 1133 in the range of 0.5 to 10 g/10 min.

13. The polyolefin composition (PO) according to claim 1, wherein the polar modified α-polyolefin (PMP) is a polar modified α-polyolefin (PMP) grafted with maleic anhydride.

14. The polyolefin composition (PO) according to claim 1, wherein the α-polyolefin (pre-PMP) to be modified is an elastomeric ethylene copolymer (EEC).

15. The polyolefin composition (PO) according to claim 1, wherein the polyolefin composition (PO) has:
   (a) a tensile modulus of at least 700 MPa, and/or
   (b) an impact strength at 23° C. of at least 40 $kJ/m^2$, and/or
   (c) a shrinkage in flow (sector, radius 300 mm, opening angle 20°) of below 1.50%.

16. An automotive article comprising a polyolefin composition (PO) according to claim 1, wherein the automotive article is an exterior automotive article.

17. A process for the preparation of the polyolefin composition (PO) according to claim 1, by extruding the heterophasic propylene copolymer (HECO) and the polar modified α-polyolefin (PMP) in an extruder.

18. The process according to claim 17, wherein the heterophasic propylene copolymer (HECO) is obtained by producing the (semi)crystalline polypropylene (PP) in a first reaction zone comprising at least one reactor, transferring said (semi)crystalline polypropylene (PP) in a subsequent reaction zone comprising at least one reactor, where in the presence of the (semi)crystalline polypropylene (PP) the elastomeric propylene copolymer (EPC) is produced.

19. The polyolefin composition (PO) according to claim 4, wherein:
   (a) said polyolefin composition (PO) has a xylene cold soluble (XCS) fraction in the range of 28 to 45 wt. % and/or
   (b) the xylene cold soluble (XCS) fraction of said polyolefin composition (PO) has an intrinsic viscosity in the range of 1.80 to 3.30 dl/g.

20. An automotive article comprising a polyolefin composition (PO) according to claim 3, wherein the automotive article is an exterior automotive article.

21. An automotive article comprising a polyolefin composition (PO) according to claim 4, wherein the automotive article is an exterior automotive article.

22. A process for the preparation of the polyolefin composition (PO) according to claim 3, by extruding the heterophasic propylene copolymer (HECO) and the polar modified α-polyolefin (PMP) in an extruder.

23. A process for the preparation of the polyolefin composition (PO) according to claim 4, by extruding the heterophasic propylene copolymer (HECO) and the polar modified α-polyolefin (PMP) in an extruder.

* * * * *